United States Patent
Liu et al.

(10) Patent No.: US 12,439,299 B2
(45) Date of Patent: Oct. 7, 2025

(54) SELF-BACKHAUL NETWORK MIGRATION METHOD AND APPARATUS AND NETWORK DEVICE

(71) Applicant: VIVO MOBILE COMMUNICATION CO., LTD., Dongguan (CN)

(72) Inventors: Jinhua Liu, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 393 days.

(21) Appl. No.: 17/989,345

(22) Filed: Nov. 17, 2022

(65) Prior Publication Data

US 2023/0076206 A1    Mar. 9, 2023

Related U.S. Application Data

(63) Continuation of application No. PCT/CN2021/097495, filed on May 31, 2021.

(30) Foreign Application Priority Data

Jun. 1, 2020   (CN) .......................... 202010486601.3

(51) Int. Cl.
H04W 4/00          (2018.01)
H04W 36/00         (2009.01)
H04W 36/08         (2009.01)

(52) U.S. Cl.
CPC ...... *H04W 36/0055* (2013.01); *H04W 36/087* (2023.05)

(58) Field of Classification Search
CPC ........... H04W 36/0055; H04W 36/087; H04W 36/34; H04W 84/047
See application file for complete search history.

(56) References Cited

U.S. PATENT DOCUMENTS

2019/0327660 A1    10/2019  Hong et al.
2021/0084545 A1*   3/2021   Akl .................. H04W 36/0085
(Continued)

FOREIGN PATENT DOCUMENTS

CN    110536350 A    12/2019
CN    110636570 A    12/2019
(Continued)

OTHER PUBLICATIONS

Z. Huang, X. Xu, T. Lu, H. Li, C. Sun and S. Wang, "Mobile Integrated Access and Backhaul Node Backhaul Link Failure Recovery with Conditional Handover," 2022 IEEE 5th International Conference on Information Systems and Computer Aided Education (ICISCAE), Dalian, China, 2022, pp. 418-422. (Year: 2022).*
(Continued)

*Primary Examiner* — Thai Dinh Hoang
(74) *Attorney, Agent, or Firm* — Stites & Harbison, PLLC; Jeffrey A. Haeberlin

(57) ABSTRACT

A self-backhaul network migration method includes: receiving, by a first IAB network node, network migration commands, where the network migration commands include a first network migration command that is used to instruct the first IAB network node to migrate from a source CU network to a target CU network, and a second network migration command that is used to instruct other network nodes to migrate from the source CU network to the target CU network, the other network nodes being downstream network nodes of the first IAB network node in a migrating IAB network; and sending, after the first IAB network node migrates to the target CU network according to the first network migration command, the second network migration command to a child IAB network node of the first IAB network node or UE served by the first IAB network node.

20 Claims, 6 Drawing Sheets

(56) References Cited

U.S. PATENT DOCUMENTS

| | | | | |
|---|---|---|---|---|
| 2021/0360439 A1* | 11/2021 | Akl | ....................... | H04W 40/22 |
| 2022/0014976 A1* | 1/2022 | Luo | ................... | H04W 36/0044 |
| 2022/0141894 A1* | 5/2022 | Akl | ....................... | H04W 40/22 |
| | | | | 370/329 |
| 2022/0225060 A1* | 7/2022 | Akl | ....................... | H04W 76/22 |
| 2022/0225219 A1* | 7/2022 | Akl | ....................... | H04W 48/16 |
| 2023/0054244 A1* | 2/2023 | Liu | ........................ | H04W 36/00 |
| 2023/0098159 A1* | 3/2023 | Liu | ........................ | H04W 36/08 |
| | | | | 370/331 |
| 2023/0130178 A1* | 4/2023 | Zhuo | ................. | H04W 36/0064 |
| | | | | 370/329 |
| 2024/0349166 A1* | 10/2024 | Lu | ........................ | H04W 36/00 |

FOREIGN PATENT DOCUMENTS

| | | | | |
|---|---|---|---|---|
| CN | 110662266 | A | 1/2020 | |
| CN | 110830979 | A | 2/2020 | |
| CN | 111093286 | A | 5/2020 | |
| CN | 111148163 | A | 5/2020 | |
| WO | 2019/246446 | A1 | 12/2019 | |
| WO | WO-2020059470 | A1 * | 3/2020 | ........ H04W 36/0055 |
| WO | 2020/093333 | A1 | 5/2020 | |
| WO | WO-2021220937 | A1 * | 11/2021 | .......... H04W 36/362 |
| WO | WO-2021260188 | A1 * | 12/2021 | ........ H04W 36/0055 |
| WO | WO-2022025818 | A1 * | 2/2022 | ........ H04W 36/0235 |
| WO | WO-2022041249 | A1 * | 3/2022 | ........ H04W 36/0033 |
| WO | WO-2022067818 | A1 * | 4/2022 | ......... H04B 7/15528 |
| WO | WO-2022076310 | A1 * | 4/2022 | ............ H04W 24/02 |
| WO | WO-2022082544 | A1 * | 4/2022 | ............ H04W 36/00 |
| WO | WO-2022082683 | A1 * | 4/2022 | ........ H04W 36/0019 |
| WO | WO-2022233008 | A1 * | 11/2022 | ............ H04W 40/36 |
| WO | WO-2023287194 | A1 * | 1/2023 | ........ H04W 36/0011 |
| WO | WO-2023011621 | A1 * | 2/2023 | |

OTHER PUBLICATIONS

China National Intellectual Property Administration, International Search Report issued in corresponding Application No. PCT/CN2021/097495, mailed Aug. 9, 2021.

3GPP TSG RAN WG3 Meeting #103. Athens, Greece, Feb. 25, 2019-Mar. 1, 2019. R3-190542. ZTE, Sanechips. Discussion on network-controlled IAB migration handling, See ISR.

European Patent Office, Extended European Search Report issued in corresponding Application No. EP 21817858 mailed Oct. 23, 2023.

Japan Patent Office, Office Action (Notice of Reasons for Refusal) issued in corresponding Application No. JP 2022-572313 mailed Oct. 5, 2023.

3GPP TSG-RAN WG2 Meeting #107, R2-1911428, Prague, Czech Republic, Aug. 26-30, 2019. On BAP Configuration for IAB.

3GPP TSG-RAN WG3 Meeting #105bis, R3-195685, Chongqing, China, Oct. 14-18, 2019. Discussion on IAB RLF and IAB reestablishment.

3GPP TSG RAN WG3 Meeting #106, R3-196689, Reno, USA, Nov. 18-22, 2019. Discussion on inter-CU IAB migration handling.

* cited by examiner

SELF-BACKHAUL NETWORK MIGRATION METHOD AND APPARATUS AND NETWORK DEVICE

CROSS-REFERENCE TO RELATED APPLICATIONS

This application is a continuation of International Application No. PCT/CN2021/097495, filed on May 31, 2021, which claims priority to Chinese Patent Application No. 202010486601.3, filed in China on Jun. 1, 2020, which is incorporated herein by reference in its entirety.

TECHNICAL FIELD

Embodiments of this application relate to the communication field, and in particular, to a self-backhaul network migration method and apparatus, and a network device.

BACKGROUND

At present, in a new radio (NR) system, integrated access and backhaul (IAB) can provide extended coverage and enhanced capacity for NR cells. An access node that supports radio access of user equipment (UE, also referred to as terminal device) and performs wireless backhaul for data is referred to as an IAB node (IABN). Data is transmitted between UE and an access node via a radio access link (access link), and data may be transmitted between access nodes via a wireless backhaul link (backhaul link).

In an IAB network architecture that supports separated deployment of centralized units (CU) and distributed units (DU), one IAB node (IABN) may include a DU function part and a mobile termination (MT) function part. Relying on the MT function part, an access node (that is, an IABN) can find an upstream access node (that is, a parent IABN, P-IABN) and establish a wireless backhaul link to a DU of that upstream access node. After an IAB node has established a complete backhaul link, the IAB node enables its DU function so that the DU provides cell service, that is, the DU can provide network access service for UEs.

In an IAB system, when a migrating IAB network is migrating from a source CU network to a target CU network, the source CU network needs to send a network migration command to all IAB network nodes in the IAB network, so as to implement migration of all the IAB network nodes in the IAB network. However, once an upstream IAB network node completes the migration, it disconnects from the source CU network, so that the migration command from the source CU network cannot be delivered to a downstream IAB network node, and consequently a network migration procedure cannot be completed.

SUMMARY

According to a first aspect of the present disclosure, a self-backhaul network migration method is provided, applied to a first IAB network node. The method includes: receiving network migration commands, where the network migration commands include a first network migration command and a second network migration command, the first network migration command is used to instruct the first IAB network node to migrate from a source CU network to a target CU network, and the second network migration command is used to instruct other network nodes to migrate from the source CU network to the target CU network, the other network nodes being downstream network nodes of the first IAB network node in a migrating IAB network; and sending, after the first IAB network node migrates to the target CU network according to the first network migration command, the second network migration command to a second IAB network node or UE served by the first IAB network node, where the second IAB network node is a child IAB network node of the first IAB network node.

According to a second aspect of the present disclosure, a self-backhaul network migration apparatus is provided, where the apparatus includes: a receiving module, configured to receive network migration commands, where the network migration commands include a first network migration command and a second network migration command, the first network migration command is used to instruct a first IAB network node to migrate from a source CU network to a target CU network, and the second network migration command is used to instruct other network nodes to migrate from the source CU network to the target CU network, the other network nodes being downstream network nodes of the first IAB network node in a migrating IAB network; and a processing module, configured to: after the first IAB network node migrates to the target CU network according to the first network migration command, send the second network migration command to a second IAB network node or UE served by the first IAB network node, where the second IAB network node is a child IAB network node of the first IAB network node.

According to a third aspect of the present disclosure, a network device is provided, including a processor, a memory, and a program or instructions stored in the memory and capable of running on the processor, where when the program or instructions are executed by the processor, the steps of the self-backhaul network migration method according to the first aspect are implemented.

According to a fourth aspect of the present disclosure, a readable storage medium is provided, where the readable storage medium stores a program or instructions, and when the program or instructions are executed by a processor, the steps of the self-backhaul network migration method according to the first aspect are implemented.

BRIEF DESCRIPTION OF DRAWINGS

The accompanying drawings described herein are intended for further understanding of this application, and constitute a part of this application. Example embodiments of this application and descriptions thereof are intended to explain this application, but do not constitute any inappropriate limitation on this application. In the accompanying drawings.

DESCRIPTION OF EMBODIMENTS

The following clearly describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, in this specification and claims, "and/or" represents at least one of connected objects, and the character "/" generally represents an "or" relationship between associated objects.

In the embodiments of this application, user equipment (UE) may include but is not limited to a mobile station (MS), a mobile terminal (Mobile Terminal), a mobile telephone (Mobile Telephone), a handset (handset), portable equipment (portable equipment), a vehicle (vehicle), and the like. The UE may communicate with one or more core networks via a radio access network (RAN). For example, an IAB network node may provide radio access services and the like for the UE. Optionally, the UE may be a mobile phone (or referred to as a "cellular" phone), a computer having a wireless communication function, and the like. The UE may alternatively be a portable, pocket-sized, handheld, computer built-in, or in-vehicle mobile apparatus.

Figure 1:
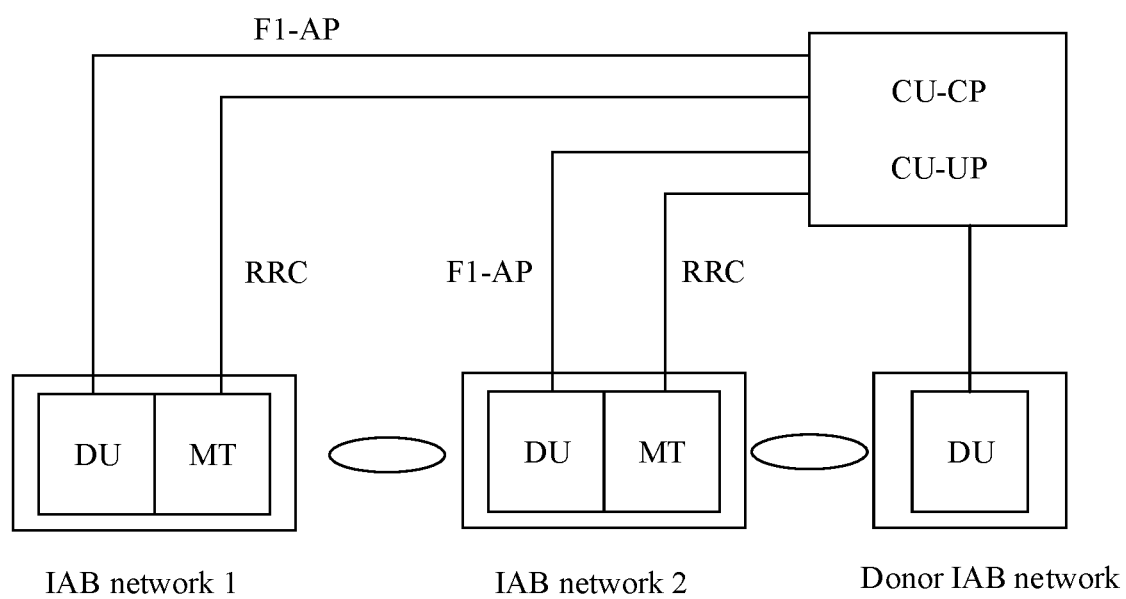
FIG. 1 is a schematic structural diagram of an IAB system according to an embodiment of this application.

FIG. 1 shows a CU-DU structure of an IAB system according to an embodiment of this application. In a self-backhaul link, a DU in an uppermost-stream IAB network node in an IAB network (such as IAB network 1 shown in FIG. 1) is connected to a CU network, and the CU network may configure the DU through the F1-AP protocol and configure an MT through the radio resource control (RRC) protocol. The self-backhaul link further includes a donor (Donor) IAB network node (or referred to as an IAB donor). The donor IAB network node does not have an MT function part, but the donor IAB network node has a directly connected wired transmission network.

Figure 2:
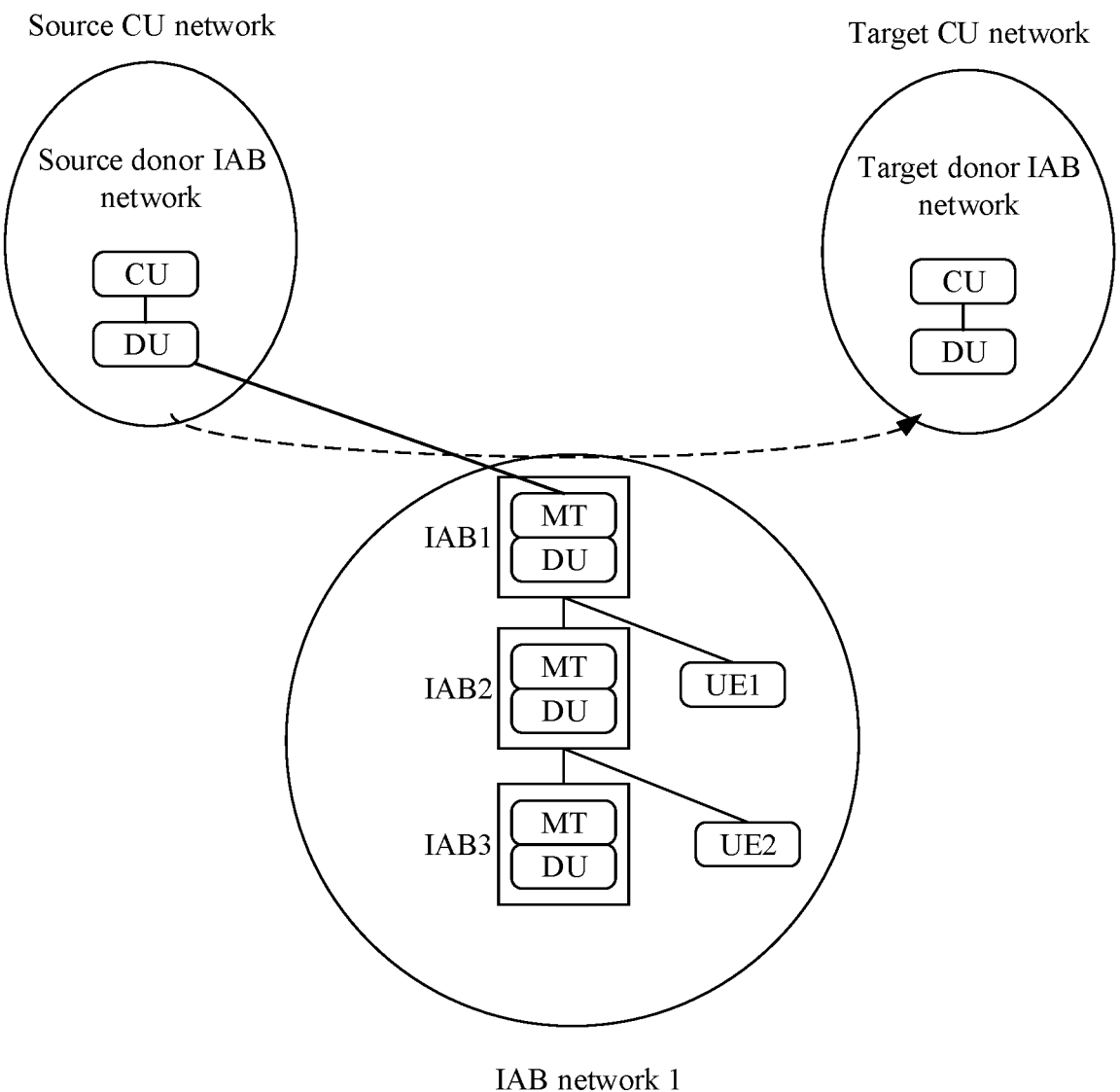
FIG. 2 is a schematic structural diagram of a migrating IAB network according to an embodiment of this application.

In practical application, using the IAB network 1 shown in FIG. 1 for example, as shown in FIG. 2, the IAB network 1 may include multiple IAB network nodes (such as IAB 1, IAB 2, IAB 3, . . . shown in FIG. 2) that are connected level by level and UEs (such as UE 1, UE 2, . . . shown in FIG. 2) that have network access service provided by the IAB network nodes. The IAB network node IAB 1 is the uppermost-stream IAB network node in the IAB network 1, the network node IAB 1 is a parent IAB network node of the downstream network node IAB 2 that is adjacent to the network node IAB 1, and the network node IAB 2 is a parent IAB network node of the downstream network node IAB 3 that is adjacent to the network node IAB 2, . . . . In other words, the network node IAB 2 is a child IAB network node of the upstream network node IAB 1 that is adjacent to the network node IAB 2, and the network node IAB 3 is a child IAB network node of the upstream network node IAB 2 that is adjacent to the network node IAB 3. In addition, one IAB network node may provide network access service for one or more UEs.

Figure 3:
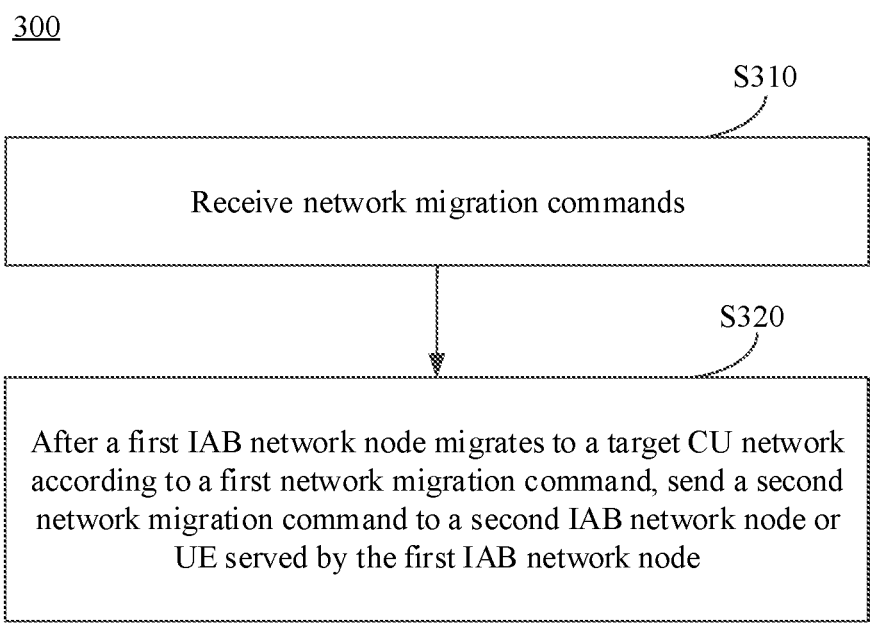
FIG. 3 is a schematic flowchart of a self-backhaul network migration method according to an embodiment of this application.

FIG. 3 shows a self-backhaul network migration method 300 according to an example embodiment of this application. The method 300 may be performed by a first IAB network node, and the first IAB network node may be any IAB network node in a migrating IAB network, for example, the "IAB 1, IAB 2, IAB 3, . . . " in FIG. 2. Alternatively, the method 300 may be performed by software or hardware installed in the first IAB network node. The method includes at least the following steps.

S310. Receive network migration commands.

The first IAB network node receives the network migration commands, where the network migration commands may include at least a first network migration command and a second network migration command, the first network migration command is used to instruct the first IAB network node to migrate from a source CU network to a target CU network, and the second network migration command is used to instruct other network nodes to migrate from the source CU network to the target CU network, the other network nodes being downstream network nodes of the first IAB network node in the migrating IAB network, where such network node may be an IAB network node or UE served by an IAB network node.

In an implementation, in a case that the first IAB network node is the uppermost-stream IAB network node (such as the IAB 1 in FIG. 2) in the migrating IAB network, this step includes receiving, by the first IAB network node, namely the uppermost-stream IAB network node (the IAB 1), the network migration commands sent by a source CU network node. In an implementation, the network migration commands may be forwarded by the source CU network node in a case that the source CU network node determines that all network migration commands that are generated by a target CU network node for network nodes in the migrating IAB network have been received. Alternatively, with reference to FIG. 2, the process of the source CU network node forwarding the network migration commands to the first IAB network node may be implemented through the following (1) to (3).

(1) The source CU network generates network migration requests (Migration Request) for all network nodes (including IAB network nodes, UEs served by the IAB network nodes, and the like) in the migrating IAB network and sends the network migration requests to the target CU network, where each network migration request includes context information of the respective network node.

(2) After receiving the network migration requests sent by the source CU network, the target CU network may establish, based on the context information of the network nodes carried in the network migration requests, a network migration environment (including DUs and MTs) serving the network nodes in the migrating IAB network, for example, establishing bearers, configuring radio resources, and configuring backhaul channels; generate network migration commands corresponding to the network nodes in the migrating IAB network (including IAB network nodes and UEs served by the IAB network nodes), for example, five network migration commands respectively corresponding to the IABs 1 to 3 and UEs 1 and 2; and send the network migration commands to the source CU network.

(3) After receiving the network migration commands, the source CU network sends the network migration commands to the uppermost-stream IAB network node in the migrating IAB network. In practical application, to prevent network migration failure caused by the uppermost-stream IAB network node disconnecting from the source CU network before having received all the network migration commands, the source CU network can forward the network migration commands to the uppermost-stream IAB network node in a case that the source CU network node determines that all network migration commands that are generated by the target CU network node for network nodes in the migrating IAB network have been received. For example, after receiving totally five network migration commands respectively corresponding to the IABs 1 to 3 and UEs 1 and 2, the source CU network forwards the network migration commands to the uppermost-stream IAB network node. How the network migration commands are sent is not limited here in this embodiment.

In another implementation, in a case that the first IAB network node is any IAB network node other than the uppermost-stream IAB network node in the migrating IAB network, the network migration commands are forwarded by a parent IAB network node of the first IAB network node in the migrating IAB network. For example, in a case that the first IAB network node is the IAB 2 shown in FIG. 2, the network migration commands are forwarded by the IAB 1 that is a parent IAB network node of the IAB 2; and in a case that the first IAB network node is the IAB 3, the network migration commands are forwarded by the IAB 2 that is a parent IAB network node of the IAB 3.

S320. After the first IAB network node migrates to the target CU network according to the first network migration command, send the second network migration command to a second IAB network node or UE served by the first IAB network node.

The second IAB network node is a child IAB network node of the first IAB network node. In an implementation, in the migrating IAB network, the foregoing child IAB network node refers to a next IAB network node that is at the downstream of the first IAB network node and adjacent to the first IAB network node. For example, with reference to FIG. 2, when the first IAB network node is the IAB 1 shown in FIG. 2, the second IAB network node may be the IAB 2 shown in FIG. 2, and the UE served by the first IAB network node may be the UE 1 shown in FIG. 2; or when the first IAB network node is the IAB 2 shown in FIG. 2, the second IAB network node may be the IAB 3 shown in FIG. 2, and the UE served by the first IAB network node may be the UE 2 shown in FIG. 2.

In practical application, the first IAB network node performs the network migration according to the first network migration command, including but not limited to reconfiguration of DU, reconfiguration of MT, and migration of data channels on the S1-U (S1 for the user plane) or NG-U interface that is related to the first IAB network node. It should be understood that the NG-U is a user plane interface between a radio access network (NG-RAN) and a 5G core network (5GC), and migration sequence of different parts and the like are not limited here in this embodiment.

In the foregoing self-backhaul network migration method provided in this embodiment, in a case that the first IAB network node has received the network migration commands, the first IAB network node sends, after migrating to the target CU network according to the first network migration command, the second network migration command to the second IAB network node or the UE served by the first IAB network node, where the second network migration command is used to instruct downstream network nodes of the first IAB network node to migrate from the source CU network to the target CU network. In this way, the second network migration command is delivered by the first IAB network node without relying on the source CU network, which effectively avoids the problem that the second migration command cannot be delivered to downstream IAB network nodes caused by the first IAB network node disconnecting from the source CU network after completion of the network migration, thereby ensuring a successful migration procedure of the migrating IAB network.

Figure 4:
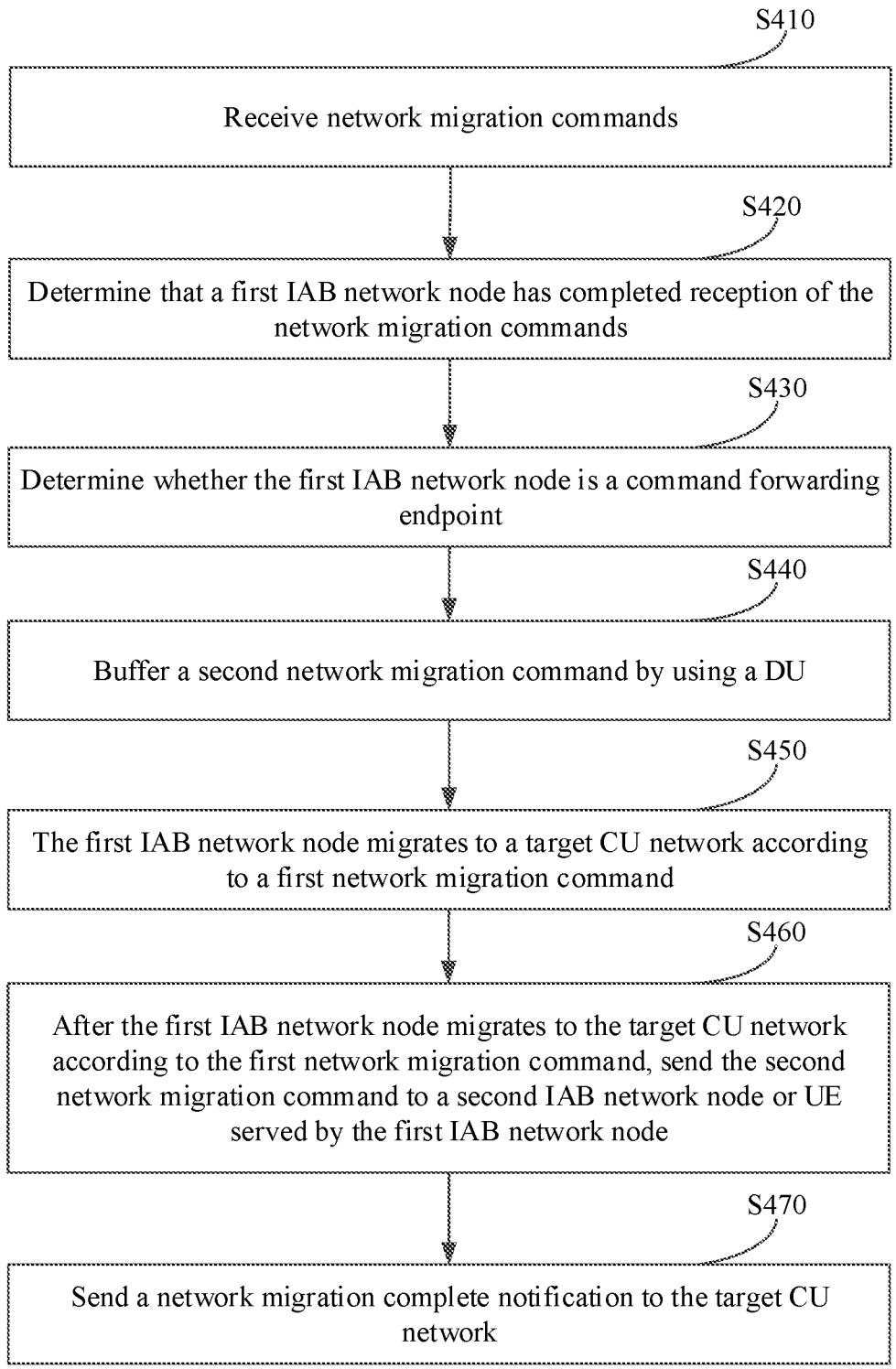
FIG. 4 is a schematic flowchart of a self-backhaul network migration method according to an embodiment of this application.

FIG. 4 shows a self-backhaul network migration method 400 according to another embodiment of this application. The method 400 may be performed by a first IAB network node, and the first IAB network node may be any IAB network node in a migrating IAB network, for example, the "IAB 1, IAB 2, IAB 3, . . . " in FIG. 2. Alternatively, the method may be performed by software or hardware installed in the first IAB network node, and the method includes the following steps.

S410. Receive network migration commands.

This step can be described in the same or similar way as step S310 in the embodiment of FIG. 3, and the repeated content is not described herein again.

In this embodiment, the network migration command may be transmitted by using a signaling container (message container).

Alternatively, a source CU network receives the network migration commands sent by a target CU network and may store the network migration commands into a signaling container that can be recognized by the first IAB network node, so that the first IAB network node can receive and recognize the first network migration command and the second network migration command by using the signaling container. For example, with reference to FIG. 2, the source CU network transmits a network migration command corresponding to the IAB 1 by using a signaling container 1, transmits a network migration command corresponding to the IAB 2 by using a signaling container 2, transmits a network migration command corresponding to the IAB 3 by using a signaling container 3, transmits a network migration command corresponding to the UE 1 by using a signaling container 4, and transmits a network migration command corresponding to the UE 2 by using a signaling container 5. Optionally, the signaling container is an F1-AP signaling container or an RRC signaling container.

In this embodiment, the network migration command is transmitted by using a signaling container, which can improve efficiency of recognizing the network migration commands by the first IAB network node, and ensure reliable transmission process of the second network migration command, thereby avoiding problems such as command loss.

S420. Determine that the first IAB network node has completed reception of the network migration commands.

In one or more implementations of this application, before the first IAB network node migrates from the source CU network to the target CU network, the first IAB network node may first determine that the first IAB network node has received all network migration commands sent by the source CU network or a parent IAB network node, so that the first IAB network node can deliver all corresponding second network migration commands to a second IAB network node or UE served by the first IAB network node, so as to instruct downstream network nodes of the first IAB network node to complete migration successfully, while avoiding the problem that the second network migration command cannot be delivered to any one of the downstream network nodes of the first IAB network node caused by the first IAB network node disconnecting from the source CU network. Alternatively, the first IAB network node may determine, according to at least one of the following three manners, that the first IAB network node has received all network migration commands sent by the source CU network or a parent IAB network node.

(1) A total number of the network migration commands received matches a total number of network migration commands indicated in the signaling container. In practical application, in an implementation, a second count of the network migration commands may be indicated in the signaling container, and in a case that a first count of the network migration commands received (including the first network migration command and the second network migration command) is equal to the second count indicated in the signaling container, it can be determined that reception of the network migration commands has been completed.

In addition, sequence numbers of the network migration commands may be further indicated in the signaling container, so that during determining, the total number of the network migration commands received and the corresponding sequence numbers of the network migration commands can both be compared and analyzed, and when both the total number and the sequence numbers match, it can be determined that reception of the network migration commands has been completed.

It should be noted that, when multiple network migration commands are correspondingly transmitted by using multiple signaling containers, the total number or/and sequence numbers of the network migration commands received can be determined according to the number or/and sequence numbers of the signaling containers received. This is not limited in this embodiment.

(2) The network migration commands received include a predetermined network migration command, where the predetermined network migration command may be an MT migration command or a DU migration command. It can be understood that, because an IAB network may include multiple IAB network nodes, and each IAB network node may include an MT and a DU, the predetermined network migration command may be a predetermined network migration command corresponding to any predetermined IAB network node, that is, the MT migration command or the DU migration command may be an MT migration command or a DU migration command corresponding to any predetermined IAB network node. This is not limited in this embodiment.

In practical application, when sending the network migration commands, the source CU network or the parent IAB network node of the first IAB network node may last send the foregoing predetermined network migration command, so that when receiving the predetermined network migration command, the first IAB network node can determine that the network migration commands sent by the source CU network or the parent IAB network node have all been received.

(3) A notification message that is used to indicate migration command transmission completion has been received. The notification message may be sent to the first IAB network node by the source CU network or the parent IAB network node after completing transmission of the network migration commands, so as to notify the first IAB network node that all network migration commands have been transmitted and a network migration procedure can be stated.

The foregoing three manners may be randomly combined. For example, the first IAB network node may determine, according to any one or two or three of the foregoing three manners, that all the network migration commands sent by the source CU network or the parent IAB network node have been received. This can ensure that all network nodes in the migrating IAB network can successfully migrate to the target CU network.

S430. Determine whether the first IAB network node is a command forwarding endpoint.

In a case that the first IAB network node is not a command forwarding endpoint, subsequent steps are performed.

On the contrary, in a case that the first IAB network node is a command forwarding endpoint, the first IAB network node can directly perform the step of migrating from the source CU network to the target CU network according to the first network migration command without buffering or forwarding the second network migration command or the signaling container. This can avoid invalid storage and forwarding of the second migration command, thereby avoiding resource waste and improving network migration efficiency.

In an implementation, the first IAB network node may determine, based on but not limited to a destination backhaul adaptation protocol (BAP) address in a routing identifier (Routing ID) that is carried in the network migration command, whether the first IAB network node is a command forwarding endpoint. The foregoing destination BAP address-based determining in this embodiment can improve determining efficiency and ensure reliability of determining results.

S440. Buffer the second network migration command by using a DU.

This step is performed after the first IAB network node receives the network migration commands and before the first IAB network node executes the first network migration command. After completing its own migration, the first IAB network node can deliver the second network migration command buffered to downstream network nodes, for example, a child IAB network node and the UE served by the first IAB network node, so as to instruct the downstream network nodes to perform network migration. In an implementation, the buffering the second network migration command may be implemented by buffering a corresponding signaling container.

S450. The first IAB network node migrates to the target CU network according to the first network migration command.

In an implementation, this step may include MT reconfiguration and DU reconfiguration.

In another implementation, to avoid that the second network migration command cannot be delivered to downstream network nodes due to configuration information mismatch between the first IAB network node and a downstream network node served by the first IAB network node (for example, the second IAB network node or the UE served by the first IAB network node) caused by DU reconfiguration performed on the first IAB network node, in one or more embodiments of this application, the process of the first IAB network node migrating from the source CU network to the target CU network according to the first network migration command may include: performing MT reconfiguration according to the first network migration command.

S460. After the first IAB network node migrates to the target CU network according to the first network migration command, send the second network migration command to the second IAB network node or the UE served by the first IAB network node.

This step can be described in the same or similar way as step S320 in the embodiment of FIG. 3, and the repeated content is not described herein again.

In a case that MT reconfiguration is performed but no DU reconfiguration is performed in S450, after S460, the method further includes: performing, after determining that the second network migration command has been sent to the second IAB network node or the UE served by the first IAB network node, DU reconfiguration on the first IAB network node according to the first network migration command. This can avoid that the second network migration command cannot be delivered to downstream network nodes due to configuration information mismatch between the first IAB network node and a downstream network node served by the first IAB network node (for example, the second IAB network node or the UE served by the first IAB network node) caused by DU reconfiguration performed on the first IAB network node.

S470. Send a network migration complete notification to the target CU network.

After determining that the second network migration command has been sent to the second IAB network node, the first IAB network node may further send a network migration complete notification to the target CU network to notify the target CU network that the first IAB network node has completed migration, enabling the target CU network to notify the source CU network that the first IAB network node has completed migration and that the source CU network can delete context information and related configuration of the first IAB network node.

In the foregoing self-backhaul network migration method provided in this embodiment, after receiving the network migration commands, the first IAB network node first buffers the second network migration command that is used to instruct downstream network nodes to perform network migration, and then sends, after the first IAB network node migrates to the target CU network, the second network migration command to the second IAB network node or the UE served by the first IAB network node. In this way, the second network migration command is delivered by the first IAB network node without relying on the source CU network, which effectively avoids the problem that the second migration command cannot be delivered to downstream IAB network nodes caused by the first IAB network node disconnecting from the source CU network after completion of the network migration, thereby ensuring a successful migration procedure of the migrating IAB network.

Figure 5:
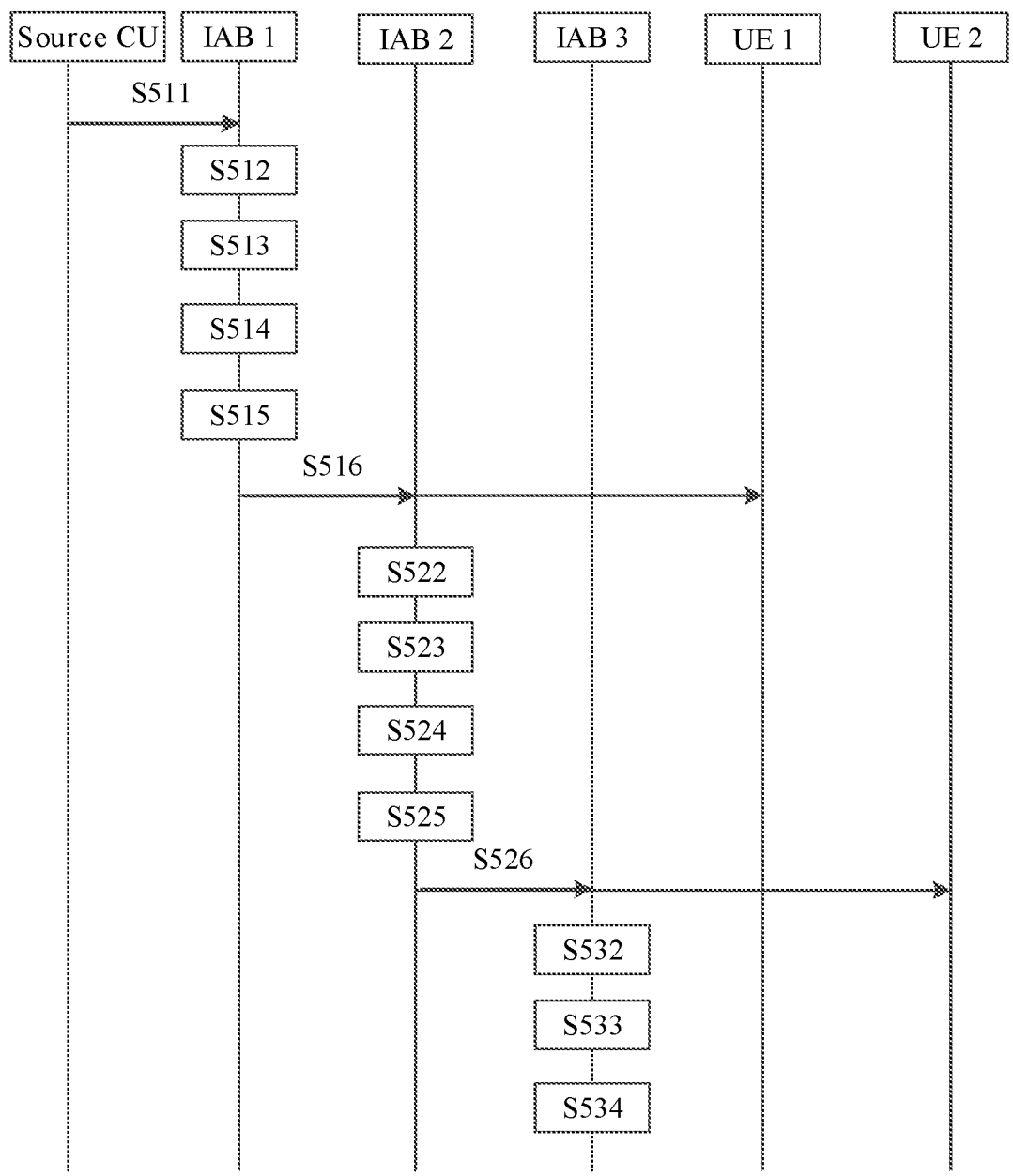
FIG. 5 is a schematic flowchart of a self-backhaul network migration method according to an embodiment of this application.

FIG. 5 shows a self-backhaul network migration method 500 according to another embodiment of this application. The method 500 may be performed by a first IAB network node, and the first IAB network node may be any IAB network node in a migrating IAB network, for example, the IAB 1, IAB 2, IAB 3, . . . , and IAB n, and the UE 1, UE2, . . . , and UE n in FIG. 2. Alternatively, the method may be performed by software or hardware installed in the first IAB network node, and the method includes the following steps.

S511. The IAB 1 receives network migration commands.

The IAB 1 serves as the first IAB network node in this step. Referring to FIG. 2, the IAB 1 serves as the uppermost-stream IAB network node in the migrating IAB network, and its downstream network nodes are other network nodes, including IAB 2, IAB 3, UE 1, and UE 2. The IAB 1 receives the network migration commands from a source CU network node, where the network migration commands include a first network migration command and a second network migration command. For example, the network migration commands may include a network migration command a that is transmitted by using a signaling container 1 and that is used to instruct the IAB 1 to perform network migration, a network migration command b that is transmitted by using a signaling container 2 and that is used to instruct the IAB 2 to perform network migration, a network migration command c that is transmitted by using a signaling container 3 and that is used to instruct the IAB 3 to perform network migration, a network migration command d that is transmitted by using a signaling container 4 and that is corresponding to the UE 1, and a network migration command e that is transmitted by using a signaling container 5 and that is corresponding to the UE 2. The network migration command a may be used as the first network migration command in this step, and the network migration commands b to e may be used as the second network migration command in this step.

For a specific implementation process of this step, refer to the corresponding description of the foregoing steps S310 and S410. The repeated content is not described herein again.

S512. The IAB 1 determines that the IAB 1 has completed reception of the network migration commands.

For a specific implementation process of this step, refer to the corresponding description of the foregoing step S420. Details are not described herein.

S513. Determine whether the IAB 1 is a command forwarding endpoint.

For a specific implementation process of this step, refer to the corresponding description of the foregoing step S430. Details are not described herein. In this embodiment, the IAB 1 is not a command forwarding endpoint. Therefore, the following steps are performed.

S514. The IAB 1 buffers the second network migration command by using a DU.

The IAB 1 buffers the network migration commands b to e by using the DU, and optionally, the IAB 1 may buffer the corresponding signaling containers 2 to 5. For a specific implementation process of this step, refer to the corresponding description of the foregoing step S440. Details are not described herein.

S515. The IAB 1 migrates from the source CU network to the target CU network according to the network migration command a.

For a specific implementation process of this step, refer to the corresponding description of the foregoing step S450. Details are not described herein.

S516. Send, after the IAB 1 migrates to the target CU network according to the network migration command a, the second network migration command to a second IAB network node or UE served by the first IAB network node.

In an implementation, in the case of sending the second network migration command to the second IAB network node, the second network migration command is transmitted by using the signaling container. For example, in a case that the IAB 1 sends the network migration commands b to e to the IAB 2, the network migration commands b to e are transmitted by using signaling containers, that is, the corresponding signaling containers 2 to 5 are transmitted.

In an implementation, in the case of sending the second network migration command to the UE served by the first IAB network node, the second network migration command in the signaling container may be read and sent to the UE. For example, in a case that the IAB 1 sends the second network migration command to the UE 1 served by the IAB 1, the IAB 1 reads the second network migration command d corresponding to the UE 1 from the signaling container, and sends the read second network migration command d to the UE 1. Correspondingly, after receiving the second network migration command d, the UE 1 migrates from the source CU network to the target CU network according to the network migration command d.

Corresponding to S516, the IAB 2 receives the network migration commands.

In this case, the IAB 2 serves as the first IAB network node that receives the network migration commands, and downstream network nodes of the IAB 2 are other network nodes, including IAB 3 and UE 2. Referring to FIG. 2, the IAB 2 is a child node of the IAB 1 in the migrating IAB network and receives the network migration commands b toe from the IAB 1, where the network migration commands b to e include the first network migration command b and the second network migration commands c, d, and e. For example, the network migration commands b to e may include the network migration command b that is transmitted by using the signaling container 2 and that is corresponding to the IAB 2, the network migration command c that is transmitted by using the signaling container 3 and that is corresponding to the IAB 3, the network migration command d that is transmitted by using the signaling container 4 and that is corresponding to the UE 1, and the network migration command e that is transmitted by using the signaling container 5 and that is corresponding to the UE 2. The network migration command b may serve as the first network migration command in this step, and the network migration commands c, d, and e may serve as the second network migration command in this step.

For a specific implementation process of this step, refer to the corresponding description of the foregoing steps S310 and S410. The repeated content is not described herein again.

S522. The IAB 2 determines that the IAB 2 has completed reception of the network migration commands.

For a specific implementation process of this step, refer to the corresponding description of the foregoing step S420. Details are not described herein.

S523. Determine whether the IAB 2 is a command forwarding endpoint.

For a specific implementation process of this step, refer to the corresponding description of the foregoing step S430. Details are not described herein. In this embodiment, the IAB 2 is not a command forwarding endpoint. Therefore, the following steps are performed.

S524. The IAB 2 buffers the second network migration command by using a DU.

The IAB 2 buffers the network migration commands c to e by using the DU, and optionally, the IAB 2 may buffer the corresponding signaling containers 3 to 5. For a specific implementation process of this step, refer to the corresponding description of the foregoing step S440. Details are not described herein.

S525. The IAB 2 migrates from the source CU network to the target CU network according to the network migration command b.

For a specific implementation process of this step, refer to the corresponding description of the foregoing step S450. Details are not described herein.

S526. After the first IAB network node migrates to the target CU network according to the first network migration command, send the second network migration command to the second IAB network node or the UE served by the first IAB network node.

In an implementation, in the case of sending the second network migration command to the second IAB network node, the second network migration command is transmitted by using the signaling container. For example, in a case that the IAB 2 sends the network migration commands c to e to the IAB 3, the network migration commands c to e are transmitted by using signaling containers, that is, the corresponding signaling containers 3 to 5 are transmitted.

In an implementation, in the case of sending the second network migration command to the UE served by the first IAB network node, the second network migration command in the signaling container may be read and sent to the UE. For example, in a case that the IAB 2 sends the second network migration command to the UE 2 served by the IAB 2, the IAB 2 reads the second network migration command e corresponding to the UE 2 from the signaling container, and sends the read second network migration command e to the UE 2. Correspondingly, after receiving the second network migration command e, the UE 2 migrates from the source CU network to the target CU network according to the network migration command e.

Corresponding to S526, the IAB 3 receives the network migration commands.

In this case, the IAB 3 serves as the first IAB network node that receives the network migration commands in this step. Referring to FIG. 2, the IAB 3 is a child node of the IAB 2 in the migrating IAB network and receives the network migration commands c to e from the IAB 2, where the network migration commands c to e include the first network migration command c and the second network migration commands d and e. For example, the network migration commands c to e may include the network migration command c that is transmitted by using the signaling container 3 and that is corresponding to the IAB 3, the network migration command d that is transmitted by using the signaling container 4 and that is corresponding to the UE 1, and the network migration command e that is transmitted by using the signaling container 5 and that is corresponding to the UE 2. The network migration command c may be used as the first network migration command in this step, and the network migration commands d and e may be used as the second network migration command in this step.

For a specific implementation process of this step, refer to the corresponding description of the foregoing steps S310 and S410. The repeated content is not described herein again.

S532. The IAB 3 determines that the IAB 3 has completed reception of the network migration commands.

For a specific implementation process of this step, refer to the corresponding description of the foregoing step S430. Details are not described herein.

S533. Determine whether the IAB 3 is a command forwarding endpoint.

For a specific implementation process of this step, refer to the corresponding description of the foregoing step S430. Details are not described herein. In this embodiment, the IAB 3 is a command forwarding endpoint. Therefore, the following step is performed.

S534. The IAB 3 migrates from the source CU network to the target CU network according to the network migration command c.

Because the IAB 3 is a command forwarding endpoint, the operation of buffering the migration command does not need to be performed.

This embodiment assumes five nodes in the migrating IAB network, namely, the IAB 1, IAB 2, IAB 3, UE 1, and UE 2. However, a person skilled in the art may apply the technical solutions described in this embodiment to an IAB network with any number of nodes without creative efforts.

It should be noted that the self-backhaul network migration method provided in the embodiments of this application may be performed by a self-backhaul network migration apparatus, or a control module in such apparatus for performing or loading the foregoing method. In the embodiments of this application, a self-backhaul network migration apparatus performing or loading the self-backhaul network migration method is used as an example for describing the self-backhaul network migration method provided in the embodiments of this application.

Figure 6:
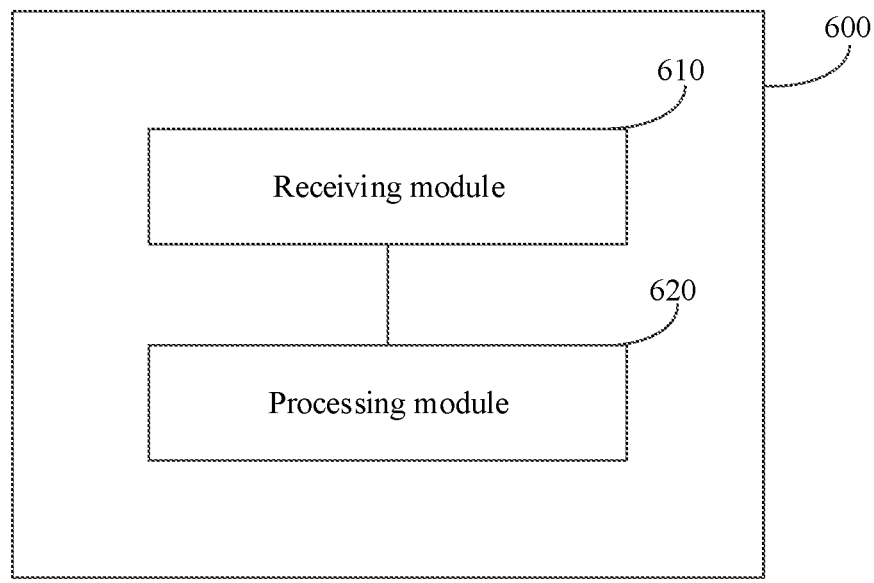
FIG. 6 is a schematic structural diagram of a self-backhaul network migration apparatus according to an embodiment of this application.

FIG. 6 is a schematic structural diagram of a self-backhaul network migration apparatus 600 according to an embodiment of this application. The self-backhaul network migration apparatus 600 may be a first IAB network node or applied to a first IAB network node. As shown in FIG. 6, the self-backhaul network migration apparatus 600 includes at least a receiving module 610 and a processing module 620.

The receiving module 610 is configured to receive network migration commands, where the network migration commands include a first network migration command and a second network migration command, the first network migration command is used to instruct the first IAB network node to migrate from a source CU network to a target CU network, and the second network migration command is used to instruct other network nodes to migrate from the source CU network to the target CU network, the other network nodes being downstream network nodes of the first IAB network node in a migrating IAB network. The processing module 620 is configured to: after the first IAB network node migrates to the target CU network according to the first network migration command, send the second network migration command to a second IAB network node or UE served by the first IAB network node, where the second IAB network node is a child IAB network node of the first IAB network node.

In one or more embodiments of this application, the processing module 620 is further configured to buffer the second network migration command by using a DU.

In one or more embodiments of this application, the network migration commands are forwarded by a source CU network node in a case that the source CU network node determines that all network migration commands that are generated by a target CU network node for network nodes in the migrating IAB network have been received; or the network migration commands are forwarded by a parent IAB network node of the first IAB network node in the migrating IAB network.

In one or more embodiments of this application, the network migration command is transmitted by using a signaling container.

In one or more embodiments of this application, in the case of sending the second network migration command to the second IAB network node, the second network migration command is transmitted by using the signaling container; and in the case of sending the second network migration command to the UE served by the first IAB network node, the processing module 620 is configured to: read the second network migration command in the signaling container and send the second network migration command to the UE.

In one or more embodiments of this application, the signaling container is an F1-AP signaling container or an RRC signaling container.

In one or more embodiments of this application, the processing module 620 is configured to: in a case that the first IAB network node is not a command forwarding endpoint, buffer the signaling container, and invoke the processing module 620 to perform the step of sending, after the first IAB network node migrates to the target CU network according to the first network migration command, the second network migration command to a second IAB network node or UE served by the first IAB network node.

In one or more embodiments of this application, the processing module 620 is configured to determine, based on a destination BAP address in a routing identifier that is carried in the network migration command, whether the first IAB network node is a command forwarding endpoint.

In one or more embodiments of this application, the receiving module 620 is configured to determine, according to at least one of the following manners, that the first IAB network node has completed reception of the network migration commands, where the following manners include: a total number of the network migration commands received matches a total number of network migration commands indicated in the signaling container; the network migration commands received include a predetermined network migration command, where the predetermined network migration command is an MT migration command or a DU migration command; and a notification message that is used to indicate migration command transmission completion has been received.

In one or more embodiments of this application, the processing module 620 is configured to: perform MT reconfiguration according to the first network migration command; and after determining that the second network migration command has been sent to the second IAB network node, perform DU reconfiguration on the first IAB network node according to the first network migration command.

In one or more embodiments of this application, the processing module 620 is further configured to send a network migration complete notification to the target CU network.

For the self-backhaul network migration apparatus 600 according to this embodiment of the present invention, reference may be made to the processes of the methods 300 and 400 in the corresponding embodiments of the present invention, and the units/modules of the self-backhaul network migration apparatus 600 and other operations and/or functions described above are respectively intended to implement the corresponding processes in the methods 300 and 400, with the same or equivalent technical effects achieved. For brevity, details are not repeated herein.

Figure 7:
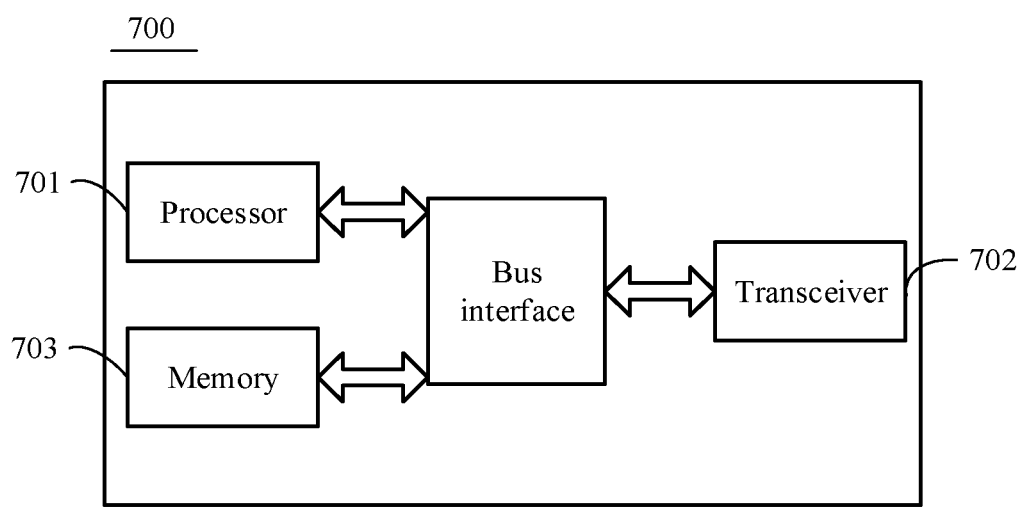
FIG. 7 is a schematic structural diagram of a network device according to an embodiment of this application.

Referring to FIG. 7, FIG. 7 is a schematic structural diagram of a network device to which a self-backhaul network migration method is applied according to an embodiment of this application. The network device can implement details of the method embodiments, for example, the steps of the method 300 or the method 400, with the same effects achieved.

As shown in FIG. 7, the network device 700 includes a processor 701, a transceiver 702, a memory 703, and a bus interface.

In this embodiment of this application, the network device 700 further includes a program or instructions stored in the memory 703 and capable of running on the processor 701, where when the program or instructions are executed by the processor 701, the processes of the foregoing embodiments of the self-backhaul network migration method, for example, the steps of the method 300 or the method 400, are implemented, with the same technical effects achieved. To avoid repetition, details are not described herein again.

In FIG. 7, a bus architecture may include any number of interconnected buses and bridges, and connect various circuits of one or more processors represented by the processor 701 and a memory represented by the memory 703. The bus architecture may further connect various other circuits, such as a peripheral device, a voltage regulator, and a power management circuit, which are well known in the art and therefore are not further described herein. A bus interface provides an interface. The transceiver 702 may be a plurality of elements, that is, the transceiver 702 includes a transmitter and a receiver, and provides units for communicating with a variety of other apparatuses over a transmission medium.

The processor 701 is responsible for managing the bus architecture and general processing, and the memory 703 may store data used by the processor 701 when performing an operation.

An embodiment of this application further provides a readable storage medium, where the readable storage medium stores a program or instructions, and when the program or instructions are executed by a processor, the processes of the foregoing embodiments of the self-backhaul network migration methods 300 and 400 are implemented, with the same technical effects achieved. To avoid repetition, details are not described herein again.

The processor is the processor in the network device in the foregoing embodiment. The readable storage medium includes a computer-readable storage medium such as a computer read-only memory (ROM), a random access memory (RAM), a magnetic disk, or an optical disc.

An embodiment of this application also provides a chip, where the chip includes a processor and a communications interface, the communications interface is coupled to the processor, and the processor is configured to run a program or instructions to implement the processes of the foregoing embodiments of the self-backhaul network migration method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A self-backhaul network migration method performed by a first integrated access and backhaul (IAB) network node, comprising:
   receiving network migration commands, wherein the network migration commands comprise a first network migration command and a second network migration command, the first network migration command is used to instruct the first IAB network node to migrate from a source donor IAB network node to a target donor IAB network node, and the second network migration command is used to instruct other network nodes to migrate from the source donor IAB network node to the target donor IAB network node, the other network nodes being downstream network nodes of the first IAB network node in a migrating IAB network; and
   sending, after the first IAB network node migrates to the target donor IAB network node according to the first network migration command, the second network migration command to a second IAB network node or user equipment UE served by the first IAB network node, wherein the second IAB network node is a child IAB network node of the first IAB network node.

2. The self-backhaul network migration method according to claim 1, wherein after the receiving network migration commands, the method further comprises:
   buffering the second network migration command by using a distributed unit (DU).

3. The self-backhaul network migration method according to claim 1, wherein the network migration commands are received from a parent IAB network node of the first IAB network node or the source donor IAB network node.

4. The self-backhaul network migration method according to claim 1, wherein the network migration command is transmitted by using a signaling container.

5. The self-backhaul network migration method according to claim 4, wherein the sending the second network migration command to a second IAB network node or UE served by the first IAB network node comprises:
   in the case of sending the second network migration command to the second IAB network node, transmitting the second network migration command by using the signaling container; and
   in the case of sending the second network migration command to the UE served by the first IAB network node, reading the second network migration command in the signaling container and sending the second network migration command to the UE.

6. The self-backhaul network migration method according to claim 5, wherein the signaling container is an F1-AP signaling container or a radio resource control (RRC) signaling container.

7. The self-backhaul network migration method according to claim 4, wherein after the receiving network migration commands, the method further comprises:
   in a case that the first IAB network node is not a command forwarding endpoint, buffering the signaling container, and performing the step of sending, after the first IAB network node migrates to the target donor IAB network node according to the first network migration command, the second network migration command to a second IAB network node or UE served by the first IAB network node.

8. The self-backhaul network migration method according to claim 7, wherein after the receiving network migration commands, the method further comprises:
   determining, based on a destination backhaul adaptation protocol (BAP) address in a routing identifier that is carried in the network migration command, whether the first IAB network node is a command forwarding endpoint.

9. The self-backhaul network migration method according to claim 4, wherein after the receiving network migration commands, the method further comprises:
   determining, according to at least one of the following manners, that the first IAB network node has completed reception of the network migration commands:
   a total number of the network migration commands received matches a total number of network migration commands indicated in the signaling container;
   the network migration commands received comprise a predetermined network migration command, wherein the predetermined network migration command is a mobile termination (MT) migration command or a DU migration command; or
   a notification message that is used to indicate migration command transmission completion has been received.

10. The self-backhaul network migration method according to claim 1, wherein the first IAB network node migrating to the target donor IAB network node comprises: performing MT reconfiguration according to the first network migration command; and
   after determining that the second network migration command has been sent to the second IAB network node, the method further comprises:
   performing DU reconfiguration on the first IAB network node according to the first network migration command.

11. The self-backhaul network migration method according to claim 10, wherein after the determining that the second network migration command has been sent to the second IAB network node, the method further comprises:
   sending a network migration complete notification to the target donor IAB network node.

12. A network device, comprising:
   a processor; and
   a memory storing a program or instructions that is capable of running in the processor, wherein the program or instructions, when executed by the processor, causes the network device to perform the following steps:
   receiving network migration commands, wherein the network migration commands comprise a first network migration command and a second network migration command, the first network migration command is used to instruct a first integrated access and backhaul (IAB) network node to migrate from a source donor IAB network node to a target donor IAB network node, and the second network migration command is used to instruct other network nodes to migrate from the source donor IAB network node to the target donor IAB network node, the other network nodes being downstream network nodes of the first IAB network node in a migrating IAB network; and
   sending, after the first IAB network node migrates to the target donor IAB network node according to the first network migration command, the second network migration command to a second IAB network node or user equipment UE served by the first IAB network node, wherein the second IAB network node is a child IAB network node of the first IAB network node.

13. The network device according to claim 12, wherein after the receiving network migration commands, the program or instructions, when executed by the processor, causes the network device to perform the following steps:
   buffering the second network migration command by using a distributed unit (DU).

14. The network device according to claim 12, wherein the network received from a parent IAB network node of the first IAB network node or the source IAB network node.

15. The network device according to claim 12, wherein the network migration command is transmitted by using a signaling container.

16. The network device according to claim 15, wherein the sending the second network migration command to a second IAB network node or UE served by the first IAB network node comprises:
   in the case of sending the second network migration command to the second IAB network node, transmitting the second network migration command by using the signaling container; and
   in the case of sending the second network migration command to the UE served by the first IAB network node, reading the second network migration command in the signaling container and sending the second network migration command to the UE.

17. The network device according to claim 16, wherein the signaling container is an F1-AP signaling container or a radio resource control (RRC) signaling container.

18. The network device according to claim 15, wherein after the receiving network migration commands, the program or instructions, when executed by the processor, causes the network device to perform the following steps:
   in a case that the first IAB network node is not a command forwarding endpoint, buffering the signaling container, and performing the step of sending, after the first IAB network node migrates to the target donor IAB network node according to the first network migration command, the second network migration command to a second IAB network node or UE served by the first IAB network node.

19. The network device according to claim 18, wherein after the receiving network migration commands, the program or instructions, when executed by the processor, causes the network device to perform the following steps:
   determining, based on a destination backhaul adaptation protocol (BAP) address in a routing identifier that is carried in the network migration command, whether the first IAB network node is a command forwarding endpoint.

20. The network device according to claim 15, wherein after the receiving network migration commands, the program or instructions, when executed by the processor, causes the network device to perform the following steps:
- determining, according to at least one of the following manners, that the first IAB network node has completed reception of the network migration commands:
- a total number of the network migration commands received matches a total number of network migration commands indicated in the signaling container;
- the network migration commands received comprise a predetermined network migration command, wherein the predetermined network migration command is a mobile termination (MT) migration command or a DU migration command; or
- a notification message that is used to indicate migration command transmission completion has been received.

* * * * *